Jan. 31, 1961   J. J. SAZYNSKI ET AL   2,970,256
SURFACE IRREGULARITY DETECTOR

Filed Feb. 2, 1955   2 Sheets-Sheet 1

INVENTORS
John J. Sazynski &
BY  Joseph F. White
R. E. Fowler
ATTORNEY

United States Patent Office 2,970,256
Patented Jan. 31, 1961

2,970,256

SURFACE IRREGULARITY DETECTOR

John J. Sazynski, Baltimore, Md., and Joseph F. White, Oak Park, Mich., assignors to General Motors Corporation, Detroit, Mich., a corporation of Delaware Filed Feb. 2, 1955, Ser. No. 485,742

2 Claims. (Cl. 324—37)

This invention relates to a means and a method for testing production parts formed of magnetizable material in order to detect surface cracks or seams.

In the past a visual inspection has usually been given to production parts to determine whether they are sound and satisfactory for use. This visual inspection detects any surface cracks or irregularities that are of some size, but where such a crack is small, it is difficult to locate and normal human error is also present. Furthermore, the handling of parts for visual inspection is relatively slow and time consuming.

It is therefore an object in making this invention to provide a method of rapidly and accurately testing parts for surface cracks and seams.

It is a further object in making this invention to provide means for automatically inspecting a part for surface cracks and irregularities.

It is a still further object in making this invention to provide means to magnetically scan a magnetizable surface and follow with a sensitive pickup indicating residual fringing magnetic fields remaining at sharp edges to detect cracks and surface flaws.

With these and other objects in view which will become apparent as the specification proceeds, our invention will be best understood by reference to the following specification and claims and the illustrations in the accompanying drawings, in which:

Figure 1:
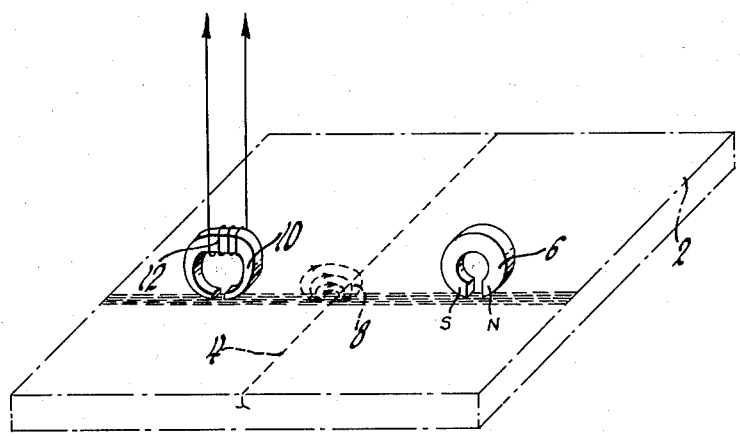
Figure 1 is a diagrammatic showing illustrating the principles of our invention.

Referring more particularly to Figure 1, there is illustrated a part 2 having a surface crack 4 in the upper surface. If a magnetizing body such as a permanent magnet 6 is moved across the upper surface of the part 2 along the path indicated, from left to right in Figure 1, the magnet will magnetize the surface of the part as it moves along. At a sharp corner or irregular surface contour the induced field in the part will be distorted or fringe out. This is illustrated in Figure 1 by the field 8 adjacent the crack 4. If an exploring or pickup member consisting of a core 10 and a coil 12 is moved along the same path and following the magnetizing member 6 at a discrete distance, this small bulging or fringing residual field will induce a pulse in the pickup coil 12 as it passes the crack which may be used to indicate the presence of the crack or flaw. The coil 12 may be connected to any suitable indicating means such as an oscillograph or oscilloscope.

Figure 2:
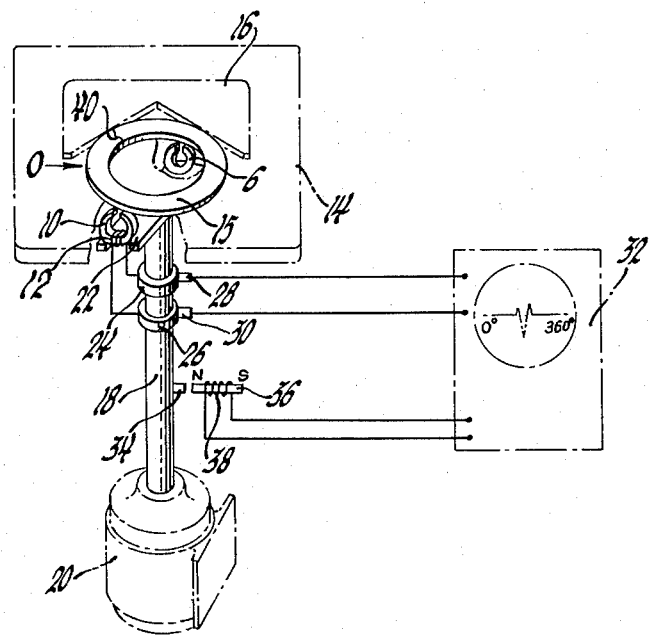
Figure 2 is a schematic diagram of a mechanism for testing circular flat parts such as washers embodying our invention.

Using the above principles mentioned in Figure 1, a machine is illustrated in Figure 2 for testing circular flat members such as washers for radial cracks or seams. It is only necessary to provide relative movement between the magnetizing means and the part to magnetize the surface. It does not make any difference as to which is the moving part. In Figure 2 the part to be tested is shown as stationary during the test and the magnetizing member and pickup are commonly mounted in spaced relation on a driven member. A flat supporting plate 14 is provided in Figure 2 upon which the part to be tested such as washer 15 is laid. A locating guide 16 is secured to the top of the plate 14 to properly position the part. The plate 14 may be made of any nonmagnetic material such as wood. Below the plate 14 there is rotatably mounted a vertical rotating shaft 18 which is driven by any motive means such for example as an electric motor 20 connected to the lower end thereto and suitably mounted on the framework. Upon the top of the rotatable shaft 18 there is mounted a transverse supporting member 22 carrying upon one end the magnetizable core 10 of the pickup member upon which is wound the pickup coil 12. The ends of the pickup coil are shown connected to two slip rings 24 and 26 which are insulated from and mounted on the shaft in order to take off the signal. Upon the other end of the supporting member 22 and moved therewith is the magnetizing magnet 6.

It is thus seen that as the shaft 18 revolves, the magnet 6 will scan the undersurface of the washer 15 to magnetize the same and create at such cracks or seams as there may be fringing magnetic fields. This magnet is then followed by the pickup member and the flux through the core 10 is changed by the fringing field at any crack to induce a pulse in the pickup coil 12. Thus during each revolution of the motor shaft 18 the washer surface is magnetized and scanned for fringing fields. Stationary brush contacts 28 and 30 ride upon the slip rings 24 and 26 respectively and are connected to the vertical control terminals of an oscilloscope 32. An indexing triggering pulse for the horizontal sweep circuit of the oscilloscope is generated and applied to the oscilloscope by a small pin 34 mounted on the shaft 18 which rotates in proximity to a small permanent magnet core 36 upon which a coil 38 is wound. When the pin 34 passes the magnet 36 the magnetic reluctance is changed sharply to produce a pulse in the coil 38 which is applied to the sweep circuit of the oscilloscope to start it scanning. If there is a flaw or surface crack such as is illustrated at 40 in the washer 15, when the pickup core 10 reaches the point of the flaw, a pulse will be generated in coil 12 to apply a sudden vertical deflecting voltage to the oscilloscope, and a pip on the tube head, such as is illustrated. This will be at a definite number of degrees from the initiation of the sweep circuit, and knowing the radial position of the pin 34, the arcuate distance to the flaw can easily be found and the flaw located. Thus all that the operator needs to do is to slip the washers into the locating guide, turn on motor 20 for a short period, and view the oscilloscope to see whether there are any deflecltions from the ordinary flat trace, and then remove and replace with another washer to be tested.

Figure 3:
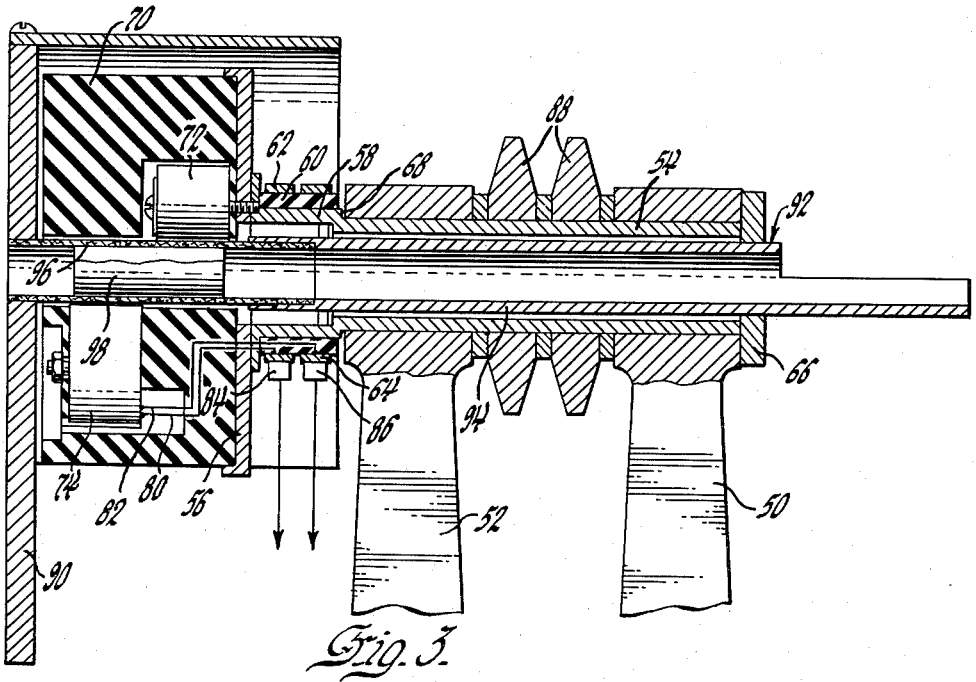
Figure 3 is an enlarged horizontal section through a machine embodying a modified form of our invention for testing cylindrical members such as roller bearings.
Figure 4:
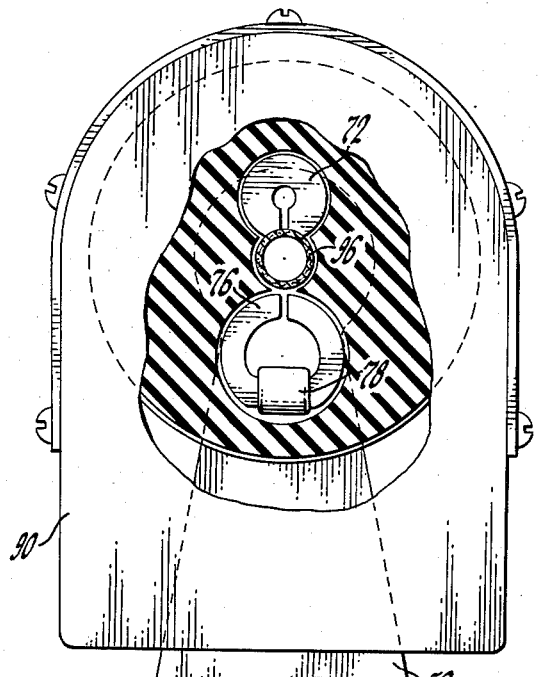
Figure 4 is an end view of the device shown in Figure 3 with parts broken away and shown in section.

The machine shown in Figures 3 and 4 embodies the same principles of operation, i.e., that of passing a magnetizing member over a surface to be tested to magnetize the same, and later scanning the surface which has been magnetized with a pickup coil to see if any fringing fields, indicating cracks, are in the surface. The mechanism or machine shown in Figures 3 and 4 is designed to test cylindrical metallic members such as roller bearings for example. The roller bearings are fed in at the right-hand end of Figure 3, pass through magnetizing and pickup coils and are ejected at the left-hand end of Figure 3. A support consisting of two arms 50 and 52 carries a rotatable hollow shaft 54 which has secured to its left end a flat flanged plate 56. The diameter of the hollow shaft 54 is slightly enlarged adjacent the left-hand end of supporting member 52 to cause a shoulder for locating purposes. This section identified as 58 has an insulating collar 60 mounted thereon which in turn carries two spaced conducting slip rings 62 and 64. The right-hand end of the hollow shaft 54 abuts a plate 66 secured to the side face of supporting member 50. Thus the member 54 rotates within bearings supplied by the members 50 and 52 and is kept from axial movement by the plate 66 on the right-hand end and the shoulder 68 on the left-hand end.

The flanged plate 56 secured to the left-hand end of the rotating shaft 54 has secured to its side surface a block 70 of insulating material. Within cavities in the insulating block 70 there are mounted first a permanent magnet 72, and secondly, a pickup member 74 consisting of a magnetizable core 76 and a pickup coil 78. These two members are not in vertical alignment but permanent magnet 72 is located in the right half of the insulating member as viewed in Figure 3, and the pickup member 74 in the center of the left-hand half. The pickup coil 78 is connected through suitable wires 80 and 82 which extend through the insulating member 70 to the slip rings 64 and 62 respectively in order to provide connections for the pulse output. A pair of sliding contacts such as brushes 84 and 86 engage slip rings 62 and 64 respectively and may be in turn connected with the vertical deflecting terminals of an oscilloscope to apply a generated pulse to give a vertical deflection indicating a crack. The hollow shaft 54 may be driven by any suitable means such for example as pulley 88.

A composite tubular member indicated generally at 92 is provided in the assembly, extends completely through the hollow shaft 54 and has its right end supported in end plate 66 and its left end supported in a housing member 90 carried by the framework. This tubular member 92 acts as a guide or track for parts to be tested conveying them through the apparatus. It consists of two sections, the first of which 94 extends through the right-hand portion of the device and may be metallic. It extends from a point outside of the hollow shaft 54 to a point adjacent the enlarged section 58 where it is rigidly secured to a second tubular portion 96 of the same internal diameter, but formed of a non-magnetic material so that it will not influence the magnet 72 or the pickup 74. This composite tubular member 92 is stationary. The right-hand end is notched to remove the upper section of the tube, providing an arcuate lower section upon which the parts to be tested may be laid.

In the operation of this device the roller bearings may be laid on the extension of the tube 92 and pushed to the left as shown in Figure 1 in sequence, each pushing the preceding ones ahead. When a roller bearing reaches a point under the rotating magnet 72, the surface of the roller bearing is magnetized and when the roller bearing is forced slightly further to the left so that it comes in alignment with the pickup 74, it is scanned by the pickup and any crack in the surface will generate a pulse in the pickup coil 78 which will be applied through the brushes 84, 86 to indicating pickup means. If the part is satisfactory, then provision may be made for operating selective releasing means to classify the parts as good or faulty automatically.

In Figure 3 a cylindrical member 98 is shown in a position at which the left-hand portion of the member 98 is being scanned by the rotating pickup member to see if any fringing fields are present at the same time that the right-hand portion of the same member is being scanned by the magnet 72 to magnetize the surface thereof. By sliding this part slightly further to the left, the right-hand portion will be scanned by the pickup means. Since the shaft 54 is driven, it does not take too long a time for the part to be surface magnetized, and then scanned, and the feeding of the parts through the tube 92 is almost continuous at a slow rate of speed.

We claim:

1. In testing apparatus, a support, a hollow tubular member mounted on said support, at least a portion of said tubular member being non-magnetic, means mounted for rotation around the non-magnetic portion of the tubular member, a magnet carried by said last-named means and a magnetic pickup mounted on said rotatable means in an axially spaced direction from said magnet so that the magnet may magnetize a part within the tubular member and the pickup scan a different section for irregular magnetic fields.

2. In testing apparatus, a support, a hollow tubular member mounted on said support, at least a portion of said tubular member being non-magnetic, means mounted for rotation around the non-magnetic portion of the tubular member, a magnet carried by said last-named means, a magnetic pickup mounted on said rotatable means in an axially spaced direction from said magnet so that the magnet may magnetize a part within the tubular member and the pickup scan a different section for irregular magnetic fields, slip rings on said rotatable means connected to the magnetic pickup and indicating means connected to said slip rings to indicate magnetic pulses induced therein.

References Cited in the file of this patent

UNITED STATES PATENTS

| | | |
|---|---|---|
| Re. 21,927 | Brace et al. | Oct. 21, 1941 |
| 2,255,053 | Gunn | Sept. 9, 1941 |
| 2,295,382 | Brace | Sept. 8, 1942 |
| 2,425,857 | Barnes et al. | Aug. 19, 1947 |
| 2,542,893 | Bender et al. | Feb. 20, 1951 |
| 2,684,464 | Hastings et al. | July 20, 1954 |

FOREIGN PATENTS

| | | |
|---|---|---|
| 594,158 | Great Britain | Nov. 4, 1947 |
| 631,987 | Great Britain | Nov. 14, 1949 |